No. 792,766. PATENTED JUNE 20, 1905.
W. F. ELLIS & E. C. DAVIS.
TIRE FOR VEHICLE WHEELS.
APPLICATION FILED AUG. 9, 1904.
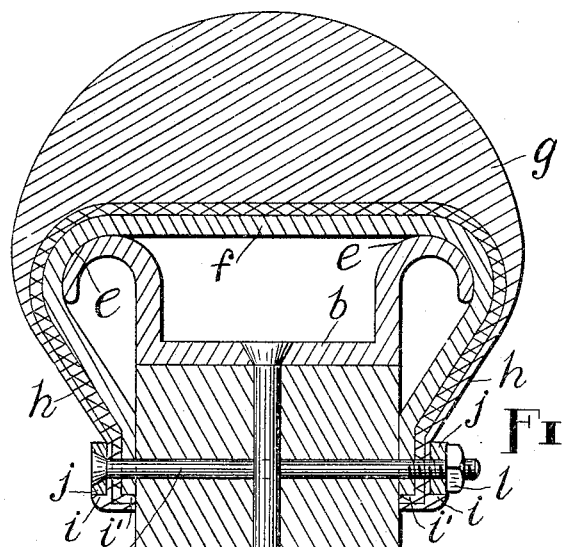
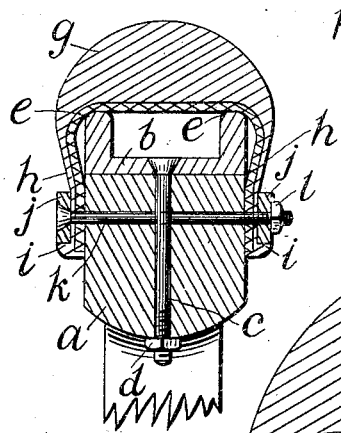
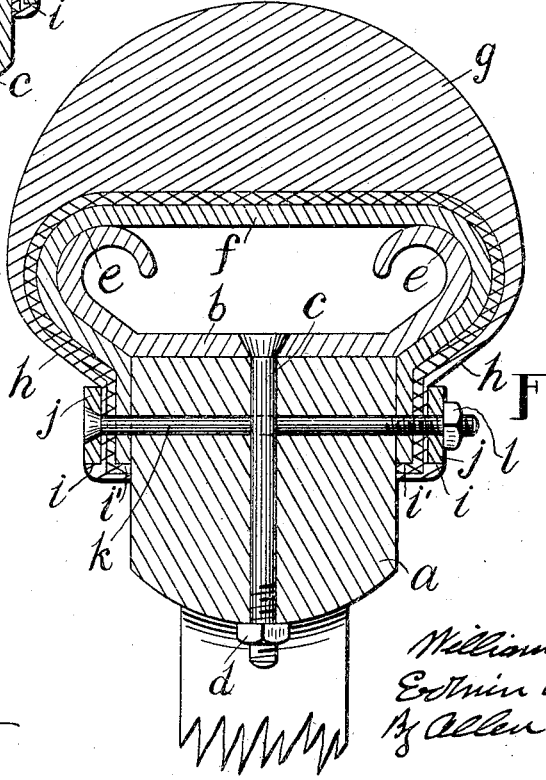
Witnesses
Inventors
William F. Ellis
Edwin C. Davis
By Allen Webster
Attorney No. 792,766. Patented June 20, 1905.

UNITED STATES PATENT OFFICE.

WILLIAM FREDERICK ELLIS, OF STAMFORD, CONNECTICUT, AND EDWIN CURTIS DAVIS, OF NEW BRUNSWICK, NEW JERSEY, ASSIGNORS TO THE UNIVERSAL TIRE COMPANY, OF NEW YORK, N. Y., A CORPORATION OF MAINE.

TIRE FOR VEHICLE-WHEELS.

SPECIFICATION forming part of Letters Patent No. 792,766, dated June 20, 1905.

Application filed August 9, 1904. Serial No. 220,075.

*To all whom it may concern:*

Be it known that we, WILLIAM FREDERICK ELLIS, a resident of Stamford, in the county of Fairfield and State of Connecticut, and EDWIN CURTIS DAVIS, a resident of New Brunswick, in the county of Middlesex and State of New Jersey, both citizens of the United States of America, have invented a new and useful Tire for Vehicle-Wheels, of which the following is a specification.

Our invention relates to improvements in tires adapted to be used on wheels for automobiles, artillery-trucks, and other heavy vehicles, more particularly in which a channel-iron is securely attached to the periphery of a wooden felly and supports a yielding tread either with or without an interposed rim-cover, suitable fastening means for the tread and cover when used being employed, these and other features, all as hereinafter set forth, constituting our invention; and the objects of our invention are, first, to provide a strong and durable cushion-tire for all sorts of wheels, and especially wheels for heavy work, which is designed to meet all requirements and is entirely practicable and efficient; second, to furnish such a tire with adequate means for easily and quickly removing and replacing the tread, this being a very desirable feature, since the tread when worn out must be replaced with a new one; third, to produce a tire which in many cases can be placed on an old wheel with very little trouble and at comparatively small expense; fourth, to provide a tread with means for securing or anchoring it in position, and, fifth, to afford protection for the edges of the rim-cover which would otherwise be exposed to the elements.

Unlike most tires, this one contracts under pressure instead of expanding—that is, the yielding part contracts—which tends to prolong the life of such part by doing away with any appreciable amount of strain at the places where the yielding part is weakest. The pressure on the tire being directly toward the center of the channel-iron and felly, the tread is forced inward into said channel-iron rather than outward, so that the sides of the same are not expanded. The strain comes on the inside of the curves of the channel-iron flanges on the same principle in a small way as that involved in the suspension-bridge, and the sides of the yielding part are not stretched to any extent by the pressure or strain on the tire.

The remarks in the preceding paragraph apply to a tire into which the rim-cover enters as a component part.

We attain these objects by the means illustrated in the accompanying drawings, in which—

Figure 1 is a cross-section of our improved tire; Fig. 2, a similar view without the rim-cover and protecting-flanges therefor, and Fig. 3 a cross-section showing a modified form of rim.

Similar letters refer to similar parts throughout the several views.

Generally speaking, our invention consists of a rim of peculiar formation mounted on the felly of a wheel and a yielding tread provided with side flaps having angular edge projections or flanges, with fastening means for such flaps, a cover, of leather or other suitable material, being generally interposed between the rim and tread. The side rings, which we prefer to use to assist in holding the tread in place, like the annular rim, are preferably continuous; but both the rings and the rim, or either, may be made and put onto the felly in segmental sections. These tires are applicable to old as well as new wheels—that is to say, it is not necessary to construct a new wheel and make extensive changes in the felly in order to employ the tire.

Referring first to Fig. 1, a section of an ordinary felly *a* is shown, on which a rim *b* is mounted and held in position by a bolt *c* and a nut *d*, the head of said bolt being in the web of the rim and the body thereof passing through the felly to receive said nut on the inside of the felly between two spokes. As many bolts and nuts are used around the felly as may be necessary to secure the rim in place.

The rim $b$ is a channel-iron having its flanges curved or rounded at the outer edges, as shown at $e$ $e$. The web of the channel-iron in this and the other views is of the same width as the felly, although this is not an essential feature, since said web may be wider or narrower. The cover $f$, of leather or other equally good material, is drawn over and around the curved parts $e$ of the rim $b$ and brought against the sides of the felly $a$, where it is secured in the manner presently to be described. This cover serves to protect the superimposed tread from abrasive wear on the rim and adds an important element of strength and durability to the construction. Furthermore, said cover makes the tire one which contracts instead of expands under pressure. A tread $g$ of substantially the form shown is placed outside of the cover $f$ and its flaps $h$ $h$ converge toward the sides of the felly $a$, those portions of the tread which pass over the curved parts $e$ of the rim $b$ being generally wider than other portions thereof. The tread consists, preferably, of rubber and a fabric lining made up in the usual manner, but may be made of any other suitable yielding material or materials. The edge of each tread-flap $h$ is flanged, as shown in $i$ and $i'$, the flange $i'$ being contiguous to the adjacent edge of the cover $f$ and serving to protect the same. Without the protection afforded the cover $f$ by the flanges $i'$, said cover, especially if consisting of leather, would be very liable to quickly deteriorate and lose its efficiency upon becoming wet. Contiguous to the two flanges $i$ and to adjacent portions of the flaps $h$ are metallic rings $j$ $j$, which rings, like the rim and tread, pass entirely around the felly, only the rings are at the sides thereof. When the rings $j$ are in position and the cover $f$ and flaps $h$ have been stretched toward the center of the wheel as far as is desired, the parts are fastened to the sides of the felly by bolts and nuts arranged at intervals around said felly, $k$ representing one such bolt, and $l$ a nut. The head of the bolt $k$, which bolt extends through the felly $a$ crosswise and at right angles to the bolt $c$ and projects beyond the sides of said felly, engages one of the rings $j$, and the projecting ends of said bolt pass through the flaps $h$ and the sides of the cover $f$, the nut $l$ being screwed onto the threaded end of the bolt outside of the second ring, through which such end finally passes.

Washers may be substituted for the rings $j$ and other equivalent means for the bolt $k$ and nut $l$, also for the bolt $c$ and nut $d$.

The cover may be omitted in some cases, as will be seen in Fig. 2, in which event only the outer flanges $i$ on the tread-flaps $h$ are required. Here the edges of the rim channel-iron are merely rounded at $e$, instead of being bent outward after the manner of a hook, as in the preceding view. Either form, however, is serviceable and one the equivalent of the other. In the last view the flanges of the rim channel-iron extend outward from the web, where in the other cases they stand at right angles to the web, and the parts $e$ are bent or curved inward and not outward, as in Fig. 1, but these changes do not affect the principle of our invention, being simply modifications applicable to the other forms. In this construction or formation the sides of the cover follow along the flanges of the rim to the sides of the felly, although this is not necessary, since the sides of the cover might just as well leave said flanges at the curves $e$ and meet the felly below or beyond the rim. The Fig. 3 formation, in which the sides of the cover and the flaps of the tread follow the flanges of the channel-iron, may be somewhat stiffer than other formations, where air-spaces are left between the flanges and cover; but it is believed there is no very material advantage either way.

When the cover $f$ is employed, it will be understood that in practice pressure applied to the thick peripheral portion of the tread causes the same to be forced into the air-space in the rim and is imparted to said cover, the curves $e$, and particularly the inside segments of such curves, affording resistance for the cover in such a manner that there is little or no strain produced on the flaps of the tread. The tire, which may be said to be steel-lined, as a whole possesses the necessary staying qualities, is durable, and has the desired degree of flexibility, and, furthermore, all elements of weakness have been eliminated from the structure.

When it is desired for any reason to remove the tread $g$ or the cover $f$, or both, it is simply necessary to release the rings $j$ from their confining bolts and nuts, and the parts are as easily reassembled.

It should be noted that the flanges $i$ and $i'$ may assume any proper angular relation with the flaps $h$ and that said flanges $i$ remove much of the strain on the flaps where they draw on the confining-bolts and serve to anchor the tread in a most substantial manner.

Changes of minor importance, other than those already pointed out, may be made without departing from the nature of our invention, especially such as relate to shape, proportion, and size.

What we claim as our invention, and desire to secure by Letters Patent, is—

1. The combination, in a tire, with a felly, of a channel-iron encircling said felly and fastened thereto, and a yielding tread spanning the opening in said channel-iron and provided with flaps fastened to the felly.

2. The combination, in a tire, with a felly, of a channel-iron encircling said felly and fastened thereto, a cover spanning the opening in said channel-iron and fastened to the felly, and a superimposed yielding tread provided with flaps also fastened to the felly.

3. The combination, in a tire, with a felly, of a channel-iron encircling said felly and fastened thereto, a yielding tread having flaps supported on or by the outwardly-extending flanges of said channel-iron, and means to fasten said flaps to the sides of the felly.

4. The combination, in a tire, with a suitable peripheral support, of a yielding tread mounted on said support and provided with flaps having flanges at their edges, a cover interposed between the support and said tread, and means to secure said cover and tread in place, said flanges being adapted to protect the edges of the cover.

5. The combination, in a tire, with a suitable peripheral support, of a yielding tread mounted on said support and provided with flaps having two-way flanges at their edges, a cover interposed between the support and said tread, and means to secure said cover and tread in place, said flanges being adapted to protect the edges of the cover and assist in securing the tread.

6. The combination, in a tire, with a felly, of a channel-iron encircling said felly and fastened thereto, a yielding tread having flaps supported on or by the outwardly-extending flanges of said channel-iron, retaining-rings for said flaps, and means to secure the flaps and rings in place at the sides of the felly.

7. The combination, in a tire, with a felly, of a channel-iron encircling said felly and fastened thereto, a yielding tread having flaps with flanges at their edges, said tread being supported on or by the outwardly-extending flanges of said channel-iron, retaining-rings for said flaps and in contact with said flanges thereon, and means to secure the flaps and rings to the felly.

8. The combination, in a tire, with a felly, of a channel-iron encircling said felly and fastened thereto, a yielding tread having flaps with flanges at their edges, said tread being supported on or by the outwardly-extending flanges of said channel-iron, a cover interposed between the channel-iron and tread, the flanges of said flaps extending over the edges of said cover, and means to secure the cover and flaps to the felly.

9. The combination, in a tire, with a felly, of a channel-iron encircling said felly and fastened thereto, a yielding tread having flaps with flanges at their edges, said tread being supported on or by the outwardly-extending flanges of said channel-iron, a cover interposed between the channel-iron and tread, retaining-rings for said flaps and in contact with certain of said flanges thereon, certain others of such flanges extending over the edges of said cover, and means to secure the cover, flaps and rings to the felly.

In testimony whereof we have signed our names to this specification in the presence of two subscribing witnesses.

WILLIAM FREDERICK ELLIS.
EDWIN CURTIS DAVIS.

Witnesses:
Jos. V. Dooley,
B. B. Sterling.